(12) United States Patent
Bertram et al.

(10) Patent No.: US 11,157,984 B2
(45) Date of Patent: Oct. 26, 2021

(54) SYSTEM AND METHOD FOR ITEM RECOMMENDATIONS

(71) Applicant: INTERNATIONAL BUSINESS MACHINES CORPORATION, Armonk, NY (US)

(72) Inventors: Ralf Bertram, Reutlingen (DE); Gerhard Schrimpf, Hosenfeld (DE); Hermann Stamm-Wilbrandt, Eberbach (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 839 days.

(21) Appl. No.: 14/088,870

(22) Filed: Nov. 25, 2013

(65) Prior Publication Data
US 2014/0081996 A1    Mar. 20, 2014

Related U.S. Application Data

(63) Continuation of application No. 10/007,583, filed on Dec. 5, 2001, now Pat. No. 8,700,448.

(30) Foreign Application Priority Data

May 10, 2001    (EP) ..................................... 01111407

(51) Int. Cl.
*G06F 16/9032* (2019.01)
*G06Q 30/02* (2012.01)
*G06Q 30/06* (2012.01)

(52) U.S. Cl.
CPC ......... *G06Q 30/0631* (2013.01); *G06Q 30/02* (2013.01); *G06Q 30/0222* (2013.01); *G06F 16/90324* (2019.01)

(58) Field of Classification Search
CPC .............. G06F 16/90324; G06Q 30/02; G06Q 30/0222

(Continued)

(56) References Cited

U.S. PATENT DOCUMENTS 3,705,409 A * 12/1972 Brayton .................. G06F 17/13
716/102
4,870,579 A    9/1989 Hey
(Continued)

OTHER PUBLICATIONS

Epinions.com, "What is Epinions.com?", http://web.archive.org/web/19991129033949/www.epions.com/what.html, 1999; Accessed Aug. 16, 2005; 5 pages.

(Continued)

*Primary Examiner* — Mohammad A. Nilforoush
*Assistant Examiner* — Cristina Owen Sherr
(74) *Attorney, Agent, or Firm* — Stephanie Carusillo; Andrew M. Calderon; Roberts Calderon Safran & Cole, P.C.

(57) ABSTRACT

Means and a computerized method for recommending items such as books and audio compact disks. For each item, a user profile includes ratings provided by users of the system. Unlike present recommendation systems, the user profiles do not include pre-computed similarity factors measuring similarity between users. Rather, when an advisee requests a recommendation, similarity measures are computed comparing the advisee to other users, and the similarity measures are associated with the other users. A subset of the users is selected, where the subset includes the users most similar to the advisee. A recommendation is made based on the ratings by the members of the selected subset.

15 Claims, 4 Drawing Sheets

(58) Field of Classification Search
 USPC .......................................................... 705/25
 See application file for complete search history.

(56) References Cited

U.S. PATENT DOCUMENTS

| | | | | |
|---|---|---|---|---|
| 4,961,139 | A * | 10/1990 | Hong | G06F 16/00 |
| 4,985,829 | A * | 1/1991 | Thatte | G06F 12/0864 |
| | | | | 711/207 |
| 4,996,642 | A | 2/1991 | Hey | |
| 5,410,598 | A | 4/1995 | Shear | |
| 5,884,282 | A * | 3/1999 | Robinson | G06F 16/335 |
| | | | | 705/7.33 |
| 6,029,195 | A | 2/2000 | Herz | |
| 6,049,777 | A * | 4/2000 | Sheena | G06Q 30/0605 |
| | | | | 705/7.32 |
| 6,092,049 | A * | 7/2000 | Chislenko | G06Q 30/02 |
| | | | | 705/7.29 |
| 6,112,186 | A * | 8/2000 | Bergh | G06Q 30/02 |
| | | | | 705/7.32 |
| 6,253,193 | B1 * | 6/2001 | Ginter | G06F 21/86 |
| | | | | 705/57 |
| 6,266,649 | B1 | 7/2001 | Linden et al. | |
| 6,317,722 | B1 | 11/2001 | Jacobi et al. | |
| 6,412,012 | B1 | 6/2002 | Bieganski et al. | |
| 6,438,579 | B1 | 8/2002 | Hosken | |
| 6,564,202 | B1 | 5/2003 | Schuetze et al. | |
| 6,567,797 | B1 | 5/2003 | Schuetze et al. | |
| 6,598,054 | B2 | 7/2003 | Schuetze et al. | |
| 6,636,836 | B1 | 10/2003 | Pyo | |
| 6,721,906 | B1 * | 4/2004 | Hirashita | G06F 3/061 |
| | | | | 714/42 |
| 6,801,909 | B2 | 10/2004 | Delgado et al. | |
| 6,853,982 | B2 | 2/2005 | Smith et al. | |
| 6,912,505 | B2 | 6/2005 | Linden et al. | |
| 6,963,850 | B1 * | 11/2005 | Bezos | G06Q 30/02 |
| | | | | 705/7.29 |
| 7,082,407 | B1 * | 7/2006 | Bezos | G06Q 30/00 |
| | | | | 705/26.7 |
| 2001/0013009 | A1 * | 8/2001 | Greening | G06Q 30/0201 |
| | | | | 705/7.14 |
| 2001/0047290 | A1 | 11/2001 | Petras et al. | |
| 2003/0036948 | A1 * | 2/2003 | Woodward | G06Q 30/02 |
| | | | | 709/231 |
| 2004/0054572 | A1 | 3/2004 | Oldale et al. | |
| 2004/0103092 | A1 * | 5/2004 | Tuzhilin | G06F 16/283 |
| 2004/0205065 | A1 | 10/2004 | Petras et al. | |
| 2005/0071251 | A1 | 3/2005 | Linden et al. | |
| 2005/0125307 | A1 * | 6/2005 | Hunt | G06Q 30/0217 |
| | | | | 705/26.61 |

OTHER PUBLICATIONS

Amazon.com, "Amazon.com Catapults Electronic Commerce to Next Level with Powerful New Features", Sep. 23, 1997; 2 pages.

* cited by examiner

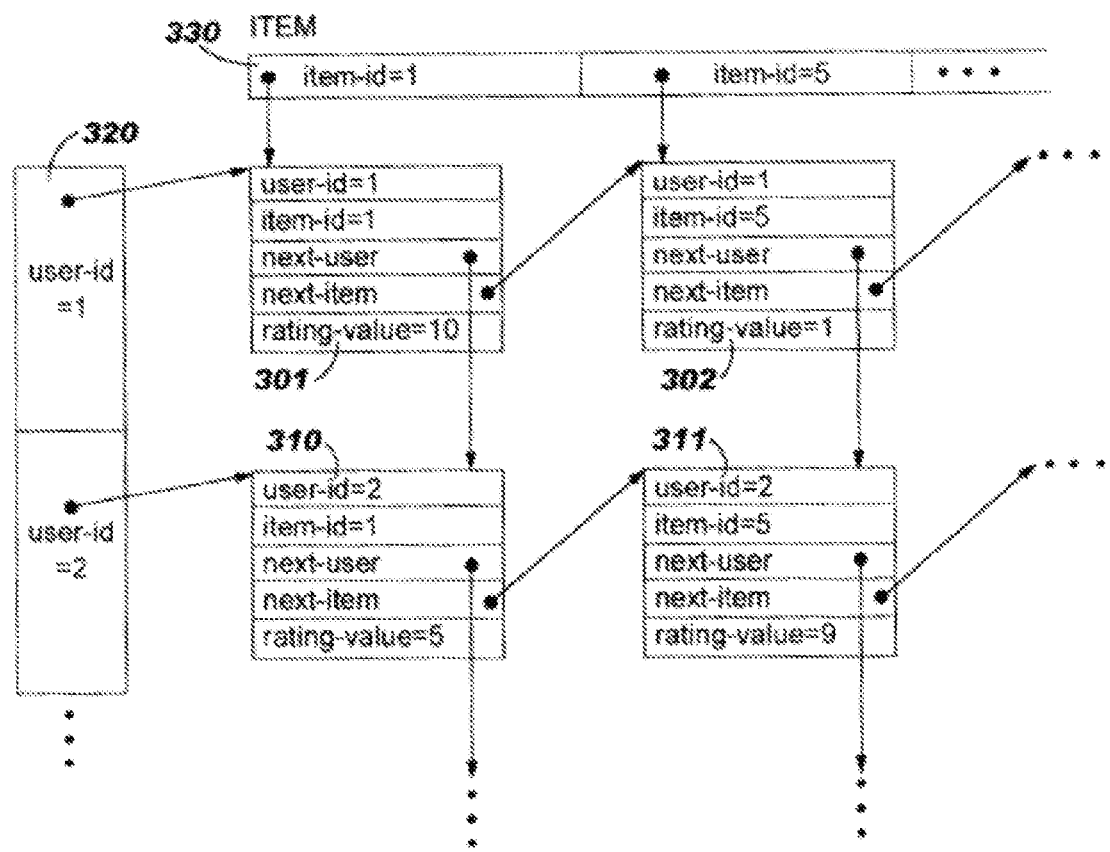

FIG. 4

401. calc(u,selected)
402. define used[v]=false for each user v
403. used[u]=true
404. initialize list N as empty list
405.
406. foreach rating ru of list USER[u] do
407.   if (selected[ru.item-id])
408.     foreach rating ri of list ITEM[ru.item-id] do
409.       u'=ri.user-id
410.       if (used[u']==false
411.         used[u']=true
412.         append tuple (u',similarity (u,u',selected)) to list N
413.
414. sort N by value t.s of each tuple t=(t.u,t.s) by quicksort/heapsort
415.
416. return N 420. similarity(x,y,selected)
421. this function is returning the similarity between user x and user y, eg. the Pierce coefficient.
422. It will be computed only on the items "it" for which selected[it]==true

FIG. 5

501. calc(u,selected)
502. if there is no computed list N(u) for user u just do the "normal" calc(u,selected)
503.
504. if timestamp(last update u) > timestampe(N(u)) do the "normal" calc(u,selected)
505.
506. foreach tuple t=(t.u,t.s) of N(u) do
507.     if (timestamp(last update t.u) > timestamp(N(u)))
508.         t.s = similarity(u,t.u,selected)
509.
510. sort N(u) by bubble sort if the number of updates is small, otherwise by quicksort/heapsort
511. update timestamp of N(u)
512. return N(u)

SYSTEM AND METHOD FOR ITEM RECOMMENDATIONS

FIELD OF INVENTION

The present invention relates to means and a method for recommending items to an advisee based on item recommendations of other users of the system. More particularly the current invention relates to an improved technology for determining neighboring users with a large degree of similarity with the advisee regarding preference for items such as books, audio, CDs, and so forth.

BACKGROUND

A new area of technology with increasing importance is the domain "collaborative filtering" or "social filtering" of information. These technologies represent a novel approach to information filtering that does not rely on the "content" of objects as is the case for content-based filtering. Instead, collaborative filtering relies on meta-data "about" objects. This meta data can either be collected automatically, i.e., data is inferred from the users' interactions with the system (for instance by the time spent reading articles as an indicator of interest), or data is voluntarily provided by the users of the system.

In essence, the main idea is to automate the process of "word-of-mouth" by which people recommend products or services to one another. If one needs to choose between a variety of options with which one does not have any experience, one will often rely on the opinions of others who do have such experience. However, when there are thousands or millions of options, like in the Web, it becomes practically impossible for an individual to locate reliable experts who can give advice about each of the options.

By shifting from an individual to a collective method of recommendation, the problem becomes more manageable. Instead of asking the opinions of individuals, one might try to determine an "average opinion" for the group. This, however, ignores an individual's particular interests, which may be different from those of the "average person". Therefore one would rather like to hear the opinions of those people who have interests similar to one's own that is to say, one would prefer a "division-of-labor" type of organization, where people only contribute to the domain they are specialized in.

The basic mechanism behind collaborative filtering is the following:
  a large group of peoples' preferences are registered;
  using a similarity metric, a subgroup of people is selected whose preferences are similar to the preferences of the person who seeks advice;
  a (possibly weighted) average of the preferences for that subgroup is calculated;
  the resulting preference function is used to recommend options on which the advice-seeker or advisee has expressed no personal opinion as yet.

Typical similarity metrics are Pearson correlation coefficients between the users' preference functions and (less frequently) vector distances or dot products. If the similarity metric has indeed selected people with similar tastes, the chances are great that the options that are highly evaluated by that group will also be appreciated by the advisee.

A typical application of collaborative filtering is the recommendation of books, music CDs, or movies. More generally, the method can be used for the selection of documents, services, products of any kind, or in general any type of resource. In the world before the Internet, rating and recommendations were provided by services such as:
  Newspapers, magazines, and books, which are rated by their editors or publishers, selecting information which they think their readers might want.
  Consumer organizations and trade magazines which evaluate and rate products.
  Published reviews of books, music, theater, films, etc.
  Peer review method of selecting submissions to scientific journals.

Examples of these technologies are, for instance, the teachings of John B. Hey, "System and method of predicting subjective reactions", U.S. Pat. No. 4,870,579 or John B. Hey, "System and method for recommending items", U.S. Pat. No. 4,996,642, both assigned to NEONICS INC., as well as Christopher P. Bergh, Max E. Metral, David Henry Ritter, Jonathan Ari Sheena, James J. Sullivan, "Distributed system for facilitating exchange of user information and opinion using automated collaborative filtering", U.S. Pat. No. 6,112,186, assigned to MICROSOFT CORPORATION.

In spite of all these advances and especially due to the increased importance of the Internet, which provides the access technology and communication infrastructure to recommendation systems, there is still a need in the art for improvement. Consequently, the invention has an objective of improving performance and efficiency when handling a flood of recommendation requests. It is a further objective of the current invention to improve the quality of the individual recommendations.

SUMMARY

The present invention relates to means and a computerized method for recommending an item to an advisee. A user profile comprises, for each of a multitude of items, at least a rating value. In contrast to the state of the art, the user profiles explicitly do not include any pre-computed similarity factor measuring similarity between users. A recommendation to an advisee is constructed by a method that includes the following steps:
  (A) a step to temporarily calculate, for use within a recommendation request only, a multitude of similarity factors measuring the similarity between the advisee and the multitude of other users. These similarity factors will then be associated with the other users,
  (B) a step to determine a subset, from the multitude of users, of the N "neighboring" users nearest the advisee as determined by the similarity factors; and
  (C) a step to recommend at least one item based on the similarity factors of the neighboring N users and based on rating values of the items by the neighboring N users.

Whereas the state of the art suggests that every update of a rating value (or a multitude of such updates) triggers a precomputation of the similarity factors and neighboring users, by contrast the current invention abandons the paradigm of creation and maintenance of static, precomputed similarity factors and neighboring users that are stored persistently. Although the proposed approach requires calculating for each recommendation request, a multitude of similarity factors of the neighboring users, overall the present invention has the surprising and counterintuitive effect of providing an important performance improvement. In an ex post investigation, this can be understood: with an increasing number of users and an increasing number of updates to the rating values, the recalculation of precomputed similarity factors and precomputed neighboring users contributes disproportionally to the processing burden of the matching/recommendation systems.

Moreover the proposed solution improves the quality of the generated recommendations, which no longer are suboptimal as given by the state of the art. Because the proposed solution includes calculating the similarity factors and neighboring users per recommendation request and without exploitation of any precomputed similarity value, outdated similarity factors do not negatively influence the quality of calculated matchings and recommendations.

BRIEF DESCRIPTION OF THE DRAWINGS

FIG. 2 depicts a preferred embodiment of the data structure common to user profiles and item profiles according to the current invention.

FIG. 3 shows an example of the combination of user profiles and item profiles reflecting the two dimensional linkage.

FIG. 4 shows a pseudo-code representation of the matching algorithm according to the current invention determining a ranked matching list that is the weighted neighboring users, of a certain user without requiring precomputed similarity factors measuring the similarity between pairs of users.

FIG. 5 reflects an enhanced matching algorithm "calc" with a time stamp handling and caching of lists of neighboring users.

DETAILED DESCRIPTION

Figure 1:
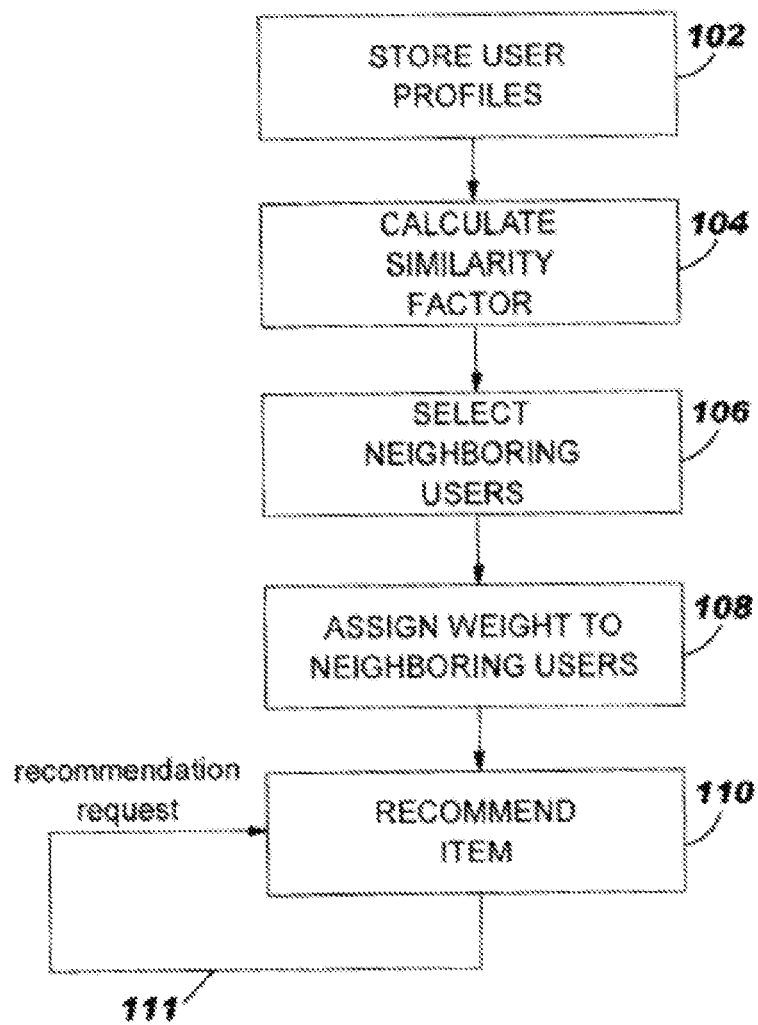
FIG. 1 gives a conceptual overview of a recommendation system.

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

As referred to in this description, items to be recommended can be items of any type; as mentioned already above an item may refer to any type of resource one can think of.

Concepts of Recommendation Systems

The following is an outline of the basic concepts of recommendation systems.

Referring now to FIG. 1, a method for recommending items begins by storing user and item information in profiles.

A plurality of user profiles is stored in a memory (step 102). One profile may be created for each user or multiple profiles may be created for a user to represent that user over multiple domains. Alternatively, a user may be represented in one domain by multiple profiles where each profile represents the proclivities of a user in a given set of circumstances. For example, a user that avoids seafood restaurants on Fridays, but not on other days of the week, could have one profile representing the user's restaurant preferences from Saturday through Thursday, and a second profile representing the user's restaurant preferences on Fridays. In some embodiments, a user profile represents more than one user. For example, a profile may be created which represents a woman and her husband for the purpose of selecting movies. Using this profile allows a movie recommendation to be given which takes into account the movie tastes of both individuals. For convenience, the remainder of this specification will use the term "user" to refer to single users of the system, as well as "composite users." The memory can be any memory known in the art that is capable of storing user profile data and allowing the user profiles to be updated, such as disc drive or random access memory.

Each user profile associates items with the ratings given to those items by the user. Each user profile may also store information in addition to the user's rating. In one embodiment, the user profile stores information about the user, e.g. name, address, or age. In another embodiment, the user profile stores information about the rating, such as the time and date the user entered the rating for the item. User profiles can be any data construct that facilitates these associations, such as an array, although it is preferred to provide user profiles as sparse vectors of n-tuples. Each n-tuple contains at least an identifier representing the rated item and an identifier representing the rating that the user gave to the item, and may include any number of additional pieces of information regarding the item, the rating, or both. Some of the additional pieces of information stored in a user profile may be calculated based on other information in the profile, for example, an average rating for a particular selection of items (e.g., heavy metal albums) may be calculated and stored in the user's profile. In some embodiments, the profiles are provided as ordered n-tuples.

Whenever a user profile is created, a number of initial ratings for items may be solicited from the user. This can be done by providing the user with a particular set of items to rate corresponding to a particular group of items. Groups are genres of items and are discussed below in more detail. Other methods of soliciting ratings from the user may include: manual entry of item-rating pairs, in which the user simply submits a list of items and ratings assigned to those items; soliciting ratings by date of entry into the system, i.e., asking the user to rate the newest items added to the system; soliciting ratings for the items having the most ratings; or by allowing a user to rate items similar to an initial item selected by the user. In still other embodiments, the system may acquire a number of ratings by monitoring the user's environment. For example, the system may assume that Web sites for which the user has created "bookmarks" are liked by that user and may use those sites as initial entries in the user's profile. One embodiment uses all of the methods described above and allows the user to select the particular method they wish to employ.

Ratings for items which are received from users can be of any form that allows users to record subjective impressions of items based on their experience of the item. For example, items may be rated on an alphabetic scale ("A" to "F") or a numerical scale (1 to 10). In one embodiment, ratings are integers between 1 (lowest) and 7 (highest). Any technology may be exploited to input these ratings into a computer system. Ratings may even be inferred by the system from the user's usage pattern. For example, the system may monitor how long the user views a particular Web page and store in that user's profile an indication that the user likes the page, assuming that the longer the user views the page, the more the user likes the page. Alternatively, a system may monitor the user's actions to determine a rating of a particular item for the user. For example, the system may infer that a user likes an item which the user mails to many people and enter in the user's profile an indication that the user likes that item. More than one aspect of user behavior may be monitored in order to infer ratings for that user, and in some embodiments, the system may have a higher confidence factor for a rating which it inferred by monitoring multiple aspects of user behavior. Confidence factors are discussed in more detail below.

Profiles for each item that has been rated by at least one user may also be stored in memory. Each item profile records how particular users have rated this particular item. Any data construct that associates ratings given to the item with the user assigning the rating can be used. It is preferred to provide item profiles as a sparse vector of n-tuples. Each n-tuple contains at least an identifier representing a particular user and an identifier representing the rating that user gave to the item, and it may contain other information, as described above in connection with user profiles.

The additional information associated with each item-rating pair can be used by the system for a variety of purposes, such as assessing the validity of the rating data. For example, if the system records the time and date the rating was entered, or inferred from the user's environment, it can determine the age of a rating for an item. A rating which is very old may indicate that the rating is less valid than a rating entered recently, for example, users' tastes may change or "drift" over time. One of the fields of the n-tuple may represent whether the rating was entered by the user or inferred by the system. Ratings that are inferred by the system may be assumed to be less valid than ratings that are actually entered by the user. Other items of information may be stored, and any combination or subset of additional information may be used to assess rating validity. In some embodiments, this validity metric may be represented as a confidence factor, that is, the combined effect of the selected pieces of information recorded in the n-tuple may be quantified as a number. In some embodiments, that number may be expressed as a percentage representing the probability that the associated rating is incorrect or as an expected deviation of the predicted rating from the "correct" value.

The user profiles are accessed in order to calculate a similarity factor for each user with respect to all other users (step 104). A similarity factor represents the degree of correlation between any two users with respect to the set of items. The calculation to be performed may be selected as a distance between the users, such that the more two users correlate, the closer the similarity factor is to zero.

Whenever a rating is received from a user or is inferred by the system from that user's behavior, the profile of that user may be updated as well as the profile of the item rated. Profile updates may be stored in a temporary memory location and entered at a convenient time or profiles may be updated whenever a new rating is entered by or inferred for that user. Profiles can be updated by appending a new n-tuple of values to the set of already existing n-tuples in the profile or, if the new rating is a change to an existing rating, overwriting the appropriate entry in the user profile. Updating a profile also requires re-computation of any profile entries that are based on other information in the profile. Especially whenever a user's profile is updated with new rating-item n-tuple, new similarity factors between the user and other users of this system should be calculated. In other embodiments, similarity factors are periodically recalculated, or recalculated in response to some other stimulus, such as a change in a neighboring user's profile.

Similarity factors for a user are calculated by comparing that user's profile with the profile of every other user of the system. This is computationally intensive, since the order of computation for calculating similarity factors in this manner is $n^2$, where n is the number of users of the system. It is possible to reduce the computational load associated with recalculating similarity factors in embodiments that store item profiles by first retrieving the profiles of the newly-rated item and determining which other users have already rated that item. The similarity factors between the newly-rating user and the users that have already rated the item are the only similarity factors updated. In general, a method for calculating similarity factors between users should minimize the deviation between a predicted rating for an item and the rating a user would actually have given the item.

Similarity factors between users refer to any quantity which expresses the degree of correlation between two user's profiles for a particular set of items. The following methods for calculating the similarity factor are intended to be exemplary, and in no way exhaustive. Depending on the item domain, different methods may produce optimal results, since users in different domains may have different expectations for rating accuracy or speed of recommendations. Different methods may be used in a single domain, and, in some embodiments, the system allows users to select the method by which they want their similarity factors produced.

In the following description of methods, $D_{xy}$ represents the similarity factor calculated between two users, x and y. $H_{ix}$ represents the rating given to item i by user x, I represents all items in the database, and $C_{ix}$ is a Boolean quantity which is 1 if user x has rated item i and 0 if user x has not rated that item.

One method of calculating the similarity between a pair of users is to calculate the average squared difference between their ratings for mutually rated items. Thus, the similarity factor between user x and user y is calculated by subtracting, for each item rated by both users, the rating given to an item by user y from the rating given to that same item by user x and squaring the difference. The squared differences are summed and divided by the total number of items rated. This method is represented mathematically by the following expression:

$$D_{xy} = \frac{\sum_{i \in I} c_{ix}(c_{iy}(H_{ix} - H_{iy}))^2}{\sum_{i \in I} c_{ix} c_{iy}}$$

A similar method of calculating the similarity factor between a pair of users is to divide the sum of their squared rating differences by the number of items rated by both users raised to a power. This method is represented by the following mathematical expression:

$$D_{xy} = \frac{\sum_{i \in C_{xy}} (H_{ix} - H_{iy})^2}{|C_{xy}|^k}$$

where $|C_{xy}|$ represents the number of items rated by both users.

A third method for calculating the similarity factor between users attempts to factor into the calculation the degree of profile overlap, i.e. the number of items rated by both users compared to the total number of items rated by either one user or the other. Thus, for each item rated by both users, the rating given to an item by user y is subtracted from the rating given to that same item by user x. These differences are squared and then summed. The amount of profile overlap is taken into account by dividing the sum of squared rating differences by a quantity equal to the number of items mutually rated by the users subtracted from the sum of the number of items rated by user x and the number of items rated by users y. This method is expressed mathematically by:

$$D_{xy} = \frac{\sum_{i \in C_{xy}} (H_{ix} - H_{iy})^2}{\sum_{i \in I} c_{ix} + \sum_{i \in I} c_{iy} - |C_{xy}|}$$

where $|C_{xy}|$ represents the number of items mutually rated by users x and y.

In another embodiment, the similarity factor between two users is a Pearson r correlation coefficient. Alternatively, the similarity factor may be calculated by constraining the correlation coefficient with a predetermined average rating value, A. Using the constrained method, the correlation coefficient, which represents $D_{xy}$, is arrived at in the following manner. For each item rated by both users, A is subtracted from the rating given to the item by user x and the rating given to that same item by user y. Those differences are then multiplied. The summed product of rating differences is divided by the product of two sums. The first sum is the sum of the squared differences of the predefined average rating value, A, and the rating given to each item by user x. The second sum is the sum of the squared differences of the predefined average value, A, and the rating given to each item by user y. This method is expressed mathematically by:

$$D_{xy} = \frac{\sum_{i \in C_{xy}} (H_{ix} - A)(H_{iy} - A)}{\sqrt{\sum_{i \in U_x} (H_{ix} - A)^2 \sum_{i \in U_y} (H_{iy} - A)^2}}$$

where $U_x$ represents all items rated by x, $U_y$ represents all items rated by y, and $C_{xy}$ represents all items rated by both x and y. The additional information included in a n-tuple may also be used when calculating the similarity factor between two users. For example, the information may be considered separately in order to distinguish between users, e.g. if a user tends to rate items only at night and another user tends to rate items only during the day, the users may be considered dissimilar to some degree, regardless of the fact that they may have rated an identical set of items identically.

Regardless of the method used to generate them, or whether the additional information contained in the profiles is used, the similarity factors are used to select a plurality of users that have a high degree of correlation to a user (step 106). These users are called the user's "neighboring users." A user may be selected as a neighboring user if that user's similarity factor with respect to the requesting user is better than a predetermined threshold value, L. The threshold value, L, can be set to any value which improves the predictive capability of the method. In general, the value of L will change depending on the method used to calculate the similarity factors, the item domain, and the size of the number of ratings that have been entered. In another embodiment, a predetermined number of users are selected from the users having a similarity factor better than L, e.g. the top twenty-five users. For embodiments in which confidence factors are calculated for each user-user similarity factor, the neighboring users can be selected based on having both a threshold value less than L and a confidence factor higher than a second predetermined threshold.

A user's neighboring user set should be updated each time that a new rating is entered by, or inferred for, that user. This requires determination of the identity of the neighboring users as well as all the similarity factors between this certain user and its neighboring users. Moreover, due to the update of a certain rating of a first user, the set of neighboring users of a multitude of other users will have to be changed. For instance this first user might need to be introduced or removed as a member of the set of neighboring users of other users; needless to say that the involved similarity factors will have to be re-computed.

With increasing number of users and increased exploitations of recommendation systems, this requirement for continuous recomputation of precomputed neighboring users and their similarity factors becomes a real processing burden for such systems. Thus in many applications it is desirable to reduce the amount of computation required to maintain the appropriate set of neighboring users by limiting the number of user profiles consulted to create the set of neighboring users. In one embodiment, instead of updating the similarity factors between a rating user and every other user of the system (which has computational order of $n^2$), only the similarity factors between the rating user and the rating user's neighbors, as well as the similarity factors between the rating user and the neighbors of the rating user's neighbors are updated. This limits the number of user profiles which must be compared to $m^2$ minus any degree of user overlap between the neighbor sets where m is a number smaller than n.

Once a set of neighboring users is chosen, a weight may be assigned to each of the neighboring users (step 108). In one embodiment, the weights are assigned by subtracting the similarity factor calculated for each neighboring user from the threshold value and dividing by the threshold value. This provides a user weight that is higher, i.e. closer to one, when the similarity factor between two users is smaller. Thus, similar users are weighted more heavily than other, less similar, users. In other embodiments, the confidence factor can be used as the weight for the neighboring users. Of course many other approaches may be chosen to assign weights to neighboring users based on the calculated similarity factors.

Once weights are assigned to the neighboring users, an item is recommended to a user (step 110). For applications in which positive item recommendations are desired, items are recommended if the user's neighboring users have also rated the item highly. For an application desiring to warn users away from items, items are displayed as recommended against when the user's neighboring users have also given poor ratings to the item.

As indicated already above, recommendation systems servicing a large number of users with a high-frequency of updating their rating values create a significant computation burden for the allocation of the precomputed similarity factors and neighboring users. Within the state of the art it is thus suggested that the similarity factors are recalculated periodically only or are recalculated only in response to some other stimulus. This approach is reflected within FIG. 1 showing that the steps 102 up to 110 to calculate the precomputed neighboring users (comprising similarity factors, weights and the neighboring users themselves) are performed only once (or at least with a low frequency) and provide a static basis for processing of a huge multitude of individual recommendation requests within step 111.

Fundamental Observations

With respect to the state of the art, one of the most critical points in generating matchings and/or recommendations is efficiency, or in other words the performance of such a system. This efficiency aspect will be experienced by a user in terms of the system's latency, i.e. the required processing time of a user's recommendation request. From the perspective of recommendation systems themselves the efficiency aspect is related to the frequency with which recommendation requests are entered into recommendation systems for processing. For online businesses, latency in the sub-second area is a must. Most existing technologies for recommendation generation based on collaborative filtering therefore use techniques like lazy write-through caches to the databases and memory caching to improve latency.

The following observations provide a deeper insight into the problems with the state of the art; these observations further will reveal the true cause of these problems and in a step by step process will help to work out the solution proposed by the current invention.

A serious deficiency of the state of the art relates to the quality of generated recommendations, which actually are sub-optimal. As determined by an analysis preceding the current invention, the cause of this problem can be traced back to the approach of the state-of-the-art technology to precompute for efficiency reasons the similarity between every pair of users with respect to their rating of items and to store these precomputed similarity factors and the resulting neighboring users persistently. If a certain user, called here an advisee triggers a request for recommendation, these precomputed similarities and the corresponding precomputed neighboring users of the advisee are exploited to form the basis for the recommendation. As it is computationally intensive to compare every pair of users for determining their similarity, the state of the art suggests precomputing these similarity factors periodically or in response to some stimulus combining the recomputation requirement due to a set of new ratings since the last recomputation only. With an increasing frequency of use of such recommendation systems (typically accessed via the Internet, which gains more and more attraction) and the increasing number of users, an increased probability exists that the currently available similarity factors (and thus the resulting precomputed neighboring users) are already outdated. As a result, recommendations based on these outdated similarity factors would represent only sub-optimal recommendations.

Moreover the analysis preceding the current invention revealed a further deficiency of the state of the art with respect to the quality of the generated recommendations relating to the concrete approach of how the similarity factors between users are determined. According to the state of the art only a single similarity value between every pair of users is calculated based on all rating values with respect to all items. In other words, the similarity between users according to the state of the art measures a "Global" property. Of course this approach is quite intuitive as it allows limiting the precomputation effort of the similarity factors. On the other hand, if an advisee is requesting recommendations for a limited subset of items only (this is the typical case according to the observation of the current teaching) the state of the art is performing a two-step approach:

1. Based on the precomputed similarities, the neighboring users of the advisee are provided in the ordering according to their "Global" similarity.
2. In a post-processing step, only those neighboring users are filtered out, which provide a rating with respect to the limited subset of items.

In these situations the precomputed similarity values are no longer adequate for ranking/weighting the neighboring users. Neighboring users rated top according to the "Global" similarity may be rated low with respect to their similarity in view of the limited subset of items and vice versa. Or in other words: in improving the efficiency of recommendation systems, often accuracy will be decreased, or only some globally optimal set of neighboring users is maintained for each user item. This makes recommendation generation for varying parts of the set of available items a process of filtering from a very large set of "Globally" similar users (with all problems associated, e.g. that global similarity cannot be optimal for many different subsets of items for which recommendations are requested).

This problem of "Accuracy" versus "Globality", which exists in all state-of-the-art recommendation systems, is further outlined by the following example referring to the MACROMEDIA product LIKEMINDS, which provides recommendations with respect to movies. After rating some movies it is possible to get recommendations for others, not yet rated. It is possible to include/exclude genres such as crime, action, and so forth. But there is only a single "globally" optimal list of similar neighbors, and the recommendation for e.g. only the genres "action" and "horror" is done by filtering. The main point here is that movies rated top in a specialized similarity list based on these two genres alone may be positioned arbitrarily low in the globally rated list. Since the size of the globally rated list is bounded in most existing systems for performance reasons the best recommendations may not even appear, or the filtering may result in an empty recommendation list in cases where good recommendations might be available.

A further observation relates to the current invention is that with an increasing number of users and an increasing number of updates to the rating values the recalculation of the precomputed similarity factors and precomputed neighboring users contributes disproportionally to the processing burden of the matching/recommendation systems.

As a solution to the above mentioned problems relating to quality and efficiency of recommendation systems, the current invention abandons the paradigm of creation and maintenance of static, precomputed similarity factors and neighboring users stored persistently. Whereas, the state of the art teaches that every update of a rating value (or a multitude of such updates) triggers a precomputation of the similarity factors and neighboring users, by contrast the current invention separates these processes. Of course the user/item profiles are used to store any updated rating value. But for generating a recommendation, precomputed similarity factors measuring similarity between users are not exploited. Instead, for each individual recommendation request by an advisee similarity factors measuring the similarity between the advisee and the multitude of users are computed for temporary use. These similarity factors calculated per recommendation request are then associated with the corresponding users, which then are exploited to determine (per recommendation request) the neighboring users of the advisee. Finally, these neighboring users (determined per recommendation request) provide the basis for calculation of a recommendation.

The similarity factors of the advisee do not necessarily need to be calculated with respect to all other users for every individual recommendation request. Of course the current teaching may be combined with a caching approach wherein similarity factors and neighboring users may be temporarily stored within a cache storage. If a next recommendation request has a need for data available within the cache, it could make use of this information (if the information is still up to date) without recomputation. This embodiment of the current invention enhanced by a cache is fundamentally different from the state of the art as it does not rely on the persistently precomputed similarity factors between each pair of users.

The fundamental decision to dynamically calculate the similarity factors with each individual recommendation request opens the door for a further embodiment of the current invention that provides additional improvements with respect to the quality of the recommendations. In this embodiment, a recommendation request comprises a so-called "selected item list". With this new approach it is now possible to determine the similarity factors between each pair of users and the corresponding neighboring users limited only to the items within the "selected item list".

Details of the Matching/Recommendation Algorithm

As indicated above, the state of the art process combines updating of rating values and additional information and recomputation of the similarity factors, weights and neighboring users. In contrast, the present invention has two phases:

(1) store/update all ratings/buying patterns in a single large sparse matrix in a computer's main memory; and
(2) postpone any calculations of similarity factors and neighboring users until a concrete request for recommendation for a specific/certain user is to be processed.

Accordingly with the present invention it is possible to abandon the paradigm of creation and maintenance of static, precomputed similarity factors and neighboring users stored persistently. To further speedup the calculation of the similarity factors and neighboring users for each individual recommendation request, it is advantageous to define user profiles and item profiles such that these data structures of all users and all items simultaneously fit into the computer's main memory and that these data structures can easily be searched by the computer system. According to the invention, the combination of user profiles and item profiles includes a multitude of identical data structures, each comprising at least a user identification and an item identification and a corresponding rating value. Given practical limitations on the computer's memory, this common data structure should be limited in size.

A preferred layout according to the current invention of the data structure common to user profiles and item profiles is depicted in FIG. 2. Each rating or nonnull matrix entry is represented by a tuple comprising as least the following data elements:

user-id: as identification of a certain user
item-id: as identification of a certain item
Next-user: as a link to an identical data structure characterizing the next user in a sequence according the user-ids
Next-item: as a link to an identical data structure characterizing the next item in a sequence according the item-ids
rating value: the rating value of the item characterized by the item-id provided by a user characterized by the user-id.

To allow these data structures to be searched easily by the computer system, they are linked in two dimensions, resulting in a matrix-like structure.

FIG. 3 shows an example of the combination of user profiles and item profiles reflecting the two dimensional linkage. The first dimension links all data structures with a same user identification in a sequence according to the item identifications. The second dimension links all data structures with a same item identification in a sequence according to the user identifications. Referring to FIG. 3, examples of the basic data structure are depicted by 301, 302, 310, and 311. In the horizontal dimension these elementary data structures are linked so that each row represents a user profile. In the vertical dimension these elementary data structures all linked so that each column represents an item profile.

Based on this combination of user profiles and item profiles a rough estimate with respect to storage requirements and latency periods on current computer systems can be given. An application on a 32 bit-architecture, with more than $2^{16}=65536$ users, less than $2^{16}$ items, and a 16 bit rating value requires only 16 bytes of memory for a single tuple. Thus, more than 100,000,000 nonnull ratings fit into a 2 GB machine. UNIX high-end machines (for instance of IBM's RISC S80 system) today allow for 64 GB of main memory. Assuming 64 bits for each of the five entries in the tuple results in 40 bytes of memory usage, which allows for more than 1,700,000,000 nonnull rating values inside main memory. For an exemplary embodiment of the invention with 250,000 users and 40 random nonnull item ratings out of 30,000 items, a single Pentium II 300 MHz CPU with 256 Mb memory provides a recommendation time (with Pierce coefficients) of 0.21 sec while using roughly 160 Mb of main memory.

By abandoning the necessity of recomputing a huge number of precomputed similarity factors whenever a rating value is updated the present invention frees processing power which may now be used for processing individual recommendation requests; or in other words the current invention allows focusing the processing power much more effectively on the individual recommendation requests.

Before discussing in detail the recommendation algorithm, the following data structures will be outlined which beneficially may be exploited by a preferred embodiment of the suggested algorithm:

A. The Data Structure "USER":

The data structure USER provides a mapping for the individual user-ids to their first entries in the linked list of nonnull ratings for the individual users, i.e. into the user profiles. These lists are ordered by item-id (this is advantageous to do Pierce computations effectively). The data structure USER is reflected within FIG. 3 under the reference sign 320.

B. The Data Structure "ITEM":

The data structure ITEM provides a mapping for item-ids to their first entries of the linked list of nonnull ratings for a specific item; i.e. into item profiles. This list need not be sorted since it only holds the item-specific "neighborhood". The data structure ITEM is reflected within FIG. 3 under the reference sign 330.

C. The Data Structure "used":

The data structure "used" provides a temporary mapping to trace which data elements have been visited and exploited already.

D. The Data Structure "selected":

The data structure "selected" is the means to communicate to the matching and recommendation algorithm (called the "calc" routine below) the so-called "selected item list", that is the set of those items specified within the recommendation request based on which a similarity calculation is to be performed. Therefore the data structure "selected" supports the new feature to dynamically determine the similarity between each pair of users with respect to a limited set of items only. For each item-id which has been selected by a user for similarity calculations, an assignment of selected [item-id]=true is input to the algorithm; in case an item-id is deselected for similarity calculation selected[item-id]=false will be input.

FIG. 4 shows a pseudo-code representation of the matching algorithm according to the current invention. The algorithm determines a ranked matching list, that is the weighted neighboring users, of an advisee without requiring precomputed similarity factors measuring the similarity between pairs of users. Moreover the suggested algorithm supports a determination of the similarity of users with respect to any subset of items provided with a recommendation request by an advisee.

Referring to FIG. 4 line 401 indicates that the matching algorithm expects as input the advisee "u" for which the weighted neighboring users "N" are to be determined. Moreover the selected item list "selected" is expected to specify the items which the calculation of the similarity between pairs of users will be based upon.

Lines 402, 403, 404 initialize the data structure "used" and the list of neighboring users "N".

When lines 406 up to 412 refer to a "Rating" ru or ri, this is to be understood as a reference to one of the basic data structures, for instance 301, 302, 310 or 311. Lines 406 up to 412 are repeated for any basic data structure ru of the advisee; this forms a repetition loop (within FIG. 3 along the horizontal dimension) by inspecting all items for which the advisee provided a rating value. As indicated by line 407 further processing is required only if an item has been found which is a member of the "selected item list". Once such an item for the advisee has been found, lines 408 up to 412 form a repetition loop (within FIG. 3 along the vertical dimension) selecting each user u', who also provided a rating value for that particular item. For each such user u' and the advisee u the corresponding similarity factors are calculated by calling the function "similarity( )" in line 412. The pseudo-code for this function is reflected in lines 420 up to 422. As the selected item list "selected" is passed to this function the similarity will be calculated only with respect to items which are a member of the selected item list (refer for instance to line 422). Within line 412 for each such user u' a tuple t=(t.u,t.s) will be calculated comprising the user-id of the user u' (t.u) and the determined similarity factors measuring the similarity (t.s) between user u' and the advisee u. Also within the line 412 this tuple t=(t.u,t.s) will be inserted into a list N of neighboring users.

Lines 410 up to 411 provide a technique to guarantee that the similarity factors between the advisee u and a further user u' will be calculated only once.

In line 414 the list N of neighboring users for the advisee u will be sorted by a sorting algorithm; the result is a weighted and ordered list of neighboring users. This list will be finally returned to the caller in line 416.

As can be seen from line 421 any similarity measure may be exploited for determining the similarity factors. In a preferred embodiment of the present invention the Pierce coefficient will be calculated.

The algorithm calc proposed within FIG. 4 performs the core task of a recommendation system, namely the calculation of the matching list that is the weighted list of neighboring users. In one embodiment of the current invention the selected item list "selected" is not only used to confine the similarity calculations based on rating values of items included in this list; it also serves to limit the recommendation system to recommend only items from within the selected item list.

In a further embodiment of the current invention, the computational efficiency of the calc algorithm may be improved by including an additional threshold value "epsilon" in the processing of line 412. If the calculated similarity between u and u' is below this threshold value, i.e. similarity (u,u')<epsilon, then the tuple (u',similarity(u,u')) is not appended to list N of neighboring users. With this technique the neighboring users N are determined by excluding those users u' with a similarity factor indicating a similarity with the advisee below the defined threshold epsilon. This speeds up the remaining sorting step and results in the relevant matching list based on the value of epsilon.

In another embodiment of the current invention the computational efficiency of the calc algorithm may be further improved by limiting the list of neighboring users to a pre-defined maximum length. The tuple t=(t.u,t.s) in line 412 is not simply appended to the list of neighboring users N but is inserted, as in a bubble sort, in decreasing order of similarity. Hence the list remains sorted during creation and may be cut at the end to ensure that it does not exceed the given maximum size (typical recommendation systems ask for the first 100 elements, some even for only the first 10); i.e. a user with lowest similarity is excluded from the neighboring list, if otherwise the neighboring list would exceed the maximum length.

In an online system typically only a small fraction of all users are active at the same time. Therefore, in a further embodiment of the current invention maintaining a timestamp for each user's last rating value update and maintaining the last recommendation for each user with a timestamp (i.e. caching the list of neighboring users and their associated similarity factors being part of that last recommendation) allow for speeding up calc(u) tremendously.

FIG. 5 reflects an enhanced matching algorithm calc with time stamp handling and caching of lists of neighboring users.

If for the advisee u no list of neighboring users N has been calculated and cached so far, line 502 executes the standard algorithm as proposed within FIG. 4. If on the other hand a list of neighboring users N associated with a time stamp has been calculated and cached, but if it turns out by the test of line 504 that the time stamp of the last update to a rating value of the advisee is newer than the time stamp of the cached list of neighboring users N, then again the standard algorithm will be executed. Only in case that the test of line 504 determines that a list of neighboring users N associated with a time stamp has been calculated and cached, and in addition that the time stamp of the last update to a rating value of the advisee is older than the time stamp of the cached list of neighboring users N, there exists a probability that the cached list of neighboring users N may be used partially without recomputation. Therefore in this particular case lines 506 up to 508 calculate the similarity factors only for that subset of users u' who updated a rating value after the time stamp of the cached list of neighboring users N.

What is claimed:

1. A method for generating a recommendation of an item to an advisee, the method comprising:
   receiving, by a computing apparatus of an online recommendation system, a recommendation request including a selected item list of an advisee;
   determining, by the computing apparatus, a plurality of similarity factors based on a profile of the advisee which comprises a plurality of records, each record including a user identifier, an item identifier and a rating value so each record is linked in a first and a second dimension, the profile of the advisee provided as sparse vectors of n-tuples, each n-tuple containing the user identifier, the item identifier and an identifier representing the rating,
   wherein a linking in the first dimension is a linking to the user identifier in a sequence according to the item identifier to represent the profile of the advisee;
   wherein a linking in the second dimension is a linking to the item identifier in a sequence according to the user identifier to represent an item profile which records how particular users have rated a particular item;
   selecting, by the computing apparatus, a first set of users from a plurality of users of the online recommendation system based on the selected item list;
   selecting, by the computing apparatus, neighboring users from the first set of users based on similarities out of a plurality of similarity factors between the advisee and each member of the first set of users;
   filtering, by the computing apparatus, the neighboring users from the first set of users;
   receiving, by the computing apparatus, a number of ratings from the neighboring users regarding websites;
   updating, by the computing apparatus, a profile of a certain neighboring user of the neighboring users upon identification of a new rating for the certain neighboring user, by appending a new n-tuple of values to a set of already existing n-tuples in the profile of the certain neighboring user and overwriting an appropriate entry in the certain neighboring user profile when the new rating is a change to an existing rating;
   determining, by the computing apparatus, an identity of the neighboring users and all similarity factors between the certain neighboring user and its neighboring users;
   receiving update information, by the computer apparatus, with regard to new ratings by the neighboring users;
   updating, by the computing apparatus, a neighboring user set based on the received update information;
   generating, by the computing apparatus, a recommendation request of at least one item from the selected item list based on ratings provided by each of the neighboring users, the neighboring users are selected from similarity factors dynamically calculated between the advisee and corresponding neighboring users limited to the at least one item within the selected item list such that the similarity factors of the advisee are not calculated with respect to all of the neighboring users for every individual recommendation request; and
   storing, by the computing apparatus, the similarity factors and the neighboring users within a cache storage for a next recommendation request without recomputation for the similarity factors and the neighboring users;
   assigning, by the computing apparatus, confidence factors to an advisee profile and user profiles of the first set of users based on a combined effect of selected pieces of information recorded in the advisee profile and the user profiles;
   calculating, by the computing apparatus, additional pieces of information stored in the advisee profile based on an average rating for a particular selection of items;
   recalculating, by the computing apparatus, the plurality of similarity factors between the advisee and the each member of the first set of users in response to a change in a neighboring user's profile,
   wherein:
   the similarity factors minimize a deviation of a predicted rating for the item from a rating the neighboring user would have given the item,
   the first dimension is a horizontal dimension and the second dimension is a vertical dimension,
   the horizontal dimension is formed as part of a first repetition loop which inspects all items for which the advisee provided a rating value in order to find an item which is a member of the selected item list, and
   the vertical dimension is formed as part of a second repetition loop which selects a further user who also provided a rating value for the item which is the member of the selected item list such that the plurality of similarity factors are calculated once between the advisee and the further user.

2. The method of claim 1, wherein the recommendation of the at least one item includes only items that are included in the selected item list.

3. The method of claim 1, wherein the selecting the neighboring users comprises determining the similarities between the advisee and each member of the first set of users after receiving the selected item list.

4. The method of claim 3, wherein the determining the similarities between the advisee and each member of the first set of users after receiving the selected item list further comprises:
   determining the plurality of similarity factors are based on at least one advisee profile; and
   determining which of the plurality of users has already rated the at least one item.

5. The method of claim 1 wherein the determining the similarities between the advisee and each member of the first set of users after receiving the selected item list is provided by computing the plurality of similarity factors between the advisee and the neighboring users only for the items of the selected item list.

6. The method of claim 5, wherein all items upon which the computing depends are included in the selected item list.

7. The method of claim 5, wherein by the computing apparatus, the plurality of similarity factors are not calculated with respect to 100% of all users of the online recommendation system for every individual recommendation request.

8. The method of claim 1, wherein by the computing apparatus, a member of the first set of users is selected as the neighboring user in response, because the similarities between the advisee and the member are better than a predetermined threshold.

9. The method of claim 1, further comprising assigning, by the computing apparatus, a weight to each of the neighboring users, wherein similar users are weighted more heavily than other neighboring users.

10. The method of claim 1, further comprising updating, by the computing apparatus, the selected neighboring users each time a new rating is entered during the recommendation request.

11. The method of claim 1, further comprising creating, by the computing apparatus, the user profiles for each of the plurality of users, wherein similarity factors measuring the similarity between the advisee and the neighboring users are computed for temporary use.

12. The method of claim 1, further comprising updating, by the computing apparatus, the selected neighboring users each time a new rating is inferred during the recommendation request.

13. The method of claim 1, wherein ratings are inferred by the online recommendation system and the ratings that are inferred are assumed to have a different validity with respect to ratings that are entered by a neighboring user of the neighboring users, the validity is a confidence factor which is quantified as a number, and the number is a percentage representing a probability that an associated rating is an expected deviation of the predicted rating.

14. The method of claim 1, further comprising:
recording, by the computing apparatus, a time and a date the rating was entered from an environment of a neighboring user environment; and
determining, by the computing apparatus, an age of the rating from the time and the date to indicate a validity of the rating, where an older rating is less valid than a rating entered more recently.

15. The method of claim 1, further comprising recalculating periodically, by the computing apparatus, the plurality of similarity factors between the advisee and each member of the first set of users.

* * * * *